United States Patent [19]

Ichiyoshi

[11] Patent Number: 5,270,665
[45] Date of Patent: Dec. 14, 1993

[54] DEMODULATOR FOR CONTINUOUSLY AND ACCURATELY CARRYING OUT DEMODULATING OPERATION BY A FREQUENCY MULTIPLICATION METHOD

[75] Inventor: Osamu Ichiyoshi, Tokyo, Japan
[73] Assignee: NEC Corporation, Tokyo, Japan
[21] Appl. No.: 947,603
[22] Filed: Sep. 21, 1992
[30] Foreign Application Priority Data

Sep. 19, 1991 [JP] Japan .................................. 3-239969

[51] Int. Cl.[5] .......................... H03D 3/00; H04L 27/22
[52] U.S. Cl. ..................................... 329/306; 329/308; 375/80; 375/86
[58] Field of Search ............... 329/304, 306, 307, 308, 329/309; 375/52-57, 80, 83-87

[56] References Cited

U.S. PATENT DOCUMENTS 5,170,415 12/1992 Yoshida et al. ................. 329/304 X Primary Examiner—David Mis
Attorney, Agent, or Firm—Sughrue, Mion, Zinn, Macpeak & Seas

[57] ABSTRACT

For processing a multiplied signal into a modified signal in a demodulator circuit, an adder (34) sums up a first, a second, and a third processed signal into a sum signal for use as the modified signal. A first processing circuit (31) processes the multiplied signal into the first processed signal. A second processing circuit (32) processes the multiplied signal into the second processed signal in accordance with a conjugate complex clock and a complex local signal. A third signal processing circuit (33) processes the multiplied signal into the third processed signal in accordance with a complex clock and a conjugate complex local signal. The complex clock signal represents a first complex number. The complex local signal represents a second complex number. The conjugate complex clock signal represents a complex conjugate of the first complex number. The conjugate complex local signal represents a complex conjugate of the second complex number.

3 Claims, 3 Drawing Sheets

DEMODULATOR FOR CONTINUOUSLY AND ACCURATELY CARRYING OUT DEMODULATING OPERATION BY A FREQUENCY MULTIPLICATION METHOD

BACKGROUND OF THE INVENTION

This invention relates to a demodulator circuit and, in particular, to a synchronous-detection demodulator circuit which is widely used in various communication systems, for example, in a mobile communication system.

In the mobile communication system, it is necessary to use a modulation and demodulation device (modem) for carrying out burst operation. This is because communication is frequently interrupted in the mobile communication system. The modem comprises modulator and demodulator circuits which will be described in the following.

The modulator circuit is for modulating an original analog signal by phase-modulating a plurality of phases of a particular number into a modulated signal having a particular frequency. The modulated signal is used as a carrier in the mobile communication system in the manner known in the art.

The demodulator circuit is for demodulating the modulated signal into a demodulated signal. The demodulated signal is a reproduction of the orginal analog signal.

In the manner which will later be described, a conventional demodulator circuit comprises a signal converting circuit, a frequency multiplier, a signal processing circuit, a frequency demultiplier, and a signal producing circuit.

The signal converting circuit is for converting the modulated signal into a digital signal. The frequency multiplier is for multiplying the particular frequency by the particular number to produce a multiplied signal. The signal processing circuit is for processing the multiplied signal into a modified signal of a multiplied frequency. The frequency demultiplier is for demultiplying the multiplied frequency by the particular number to produce a demultiplied signal of the particular frequency. The signal producing circuit is for producing the demodulated signal in accordance with the digital and the demultiplied signals.

The conventional demodulator circuit has a disadvantage in that it is difficult to continuously and accurately carry out demodulating operation as will later be discussed in detail.

SUMMARY OF THE INVENTION

It is therefore an object of this invention to provide a demodulator circuit in which demodulating operation is continuously and accurately carried by a frequency multiplication method.

Other objects of this invention will become clear as the description proceeds.

According to this invention, there is provided a demodulator circuit for demodulating a modulated signal into a demodulated signal. The modulated signal is derived by phase-modulating in m phases an original analog signal and having a particular frequency. The demodulated signal is a reproduction of the analog signal. The demodulator circuit comprises a signal converting circuit for converting the modulated signal into a digital signal, a frequency multiplier for multiplying the particular frequency by m to produce a multiplied signal, a signal processing circuit for processing the multiplied signal into a modified signal of a multiplied frequency, a frequency demultiplier for demultiplying the multiplied frequency by m to produce a demultiplied signal of the particular frequency, and a signal producing circuit for producing the demodulated signal in accordance with the digital and the demultiplied signals. The signal processing circuit comprises a complex clock signal generator for generating a complex clock signal representing a first complex number and having a frequency which is substantially equal to the particular frequency, a local complex signal producing circuit for producing a complex local signal representing a second complex number, a first signal processing circuit connected to the frequency multiplier into a first processed signal, a second signal processing circuit connected to the frequency multiplier for processing the multiplied signal into a second processed signal in accordance with a conjugate complex clock signal supplied from the complex clock signal generator and with the complex local signal supplied from the local complex signal producing circuit, a third signal processing circuit connected to the frequency multiplier for processing the multiplied signal into a third processed signal in accordance with the complex clock signal supplied from the complex clock signal generator and with a conjugate complex local signal supplied from the local complex signal producing circuit, an adder connected to the first, the second, and the third signal processing circuits for summing up the first, the second, and the third processed signals into a sum signal, and supply means connected to the frequency demultiplier and the adder for supplying the sum signal as the modified signal as the to the frequency demultiplier.

DESCRIPTION OF THE PREFERRED EMBODIMENT

Figure 1:
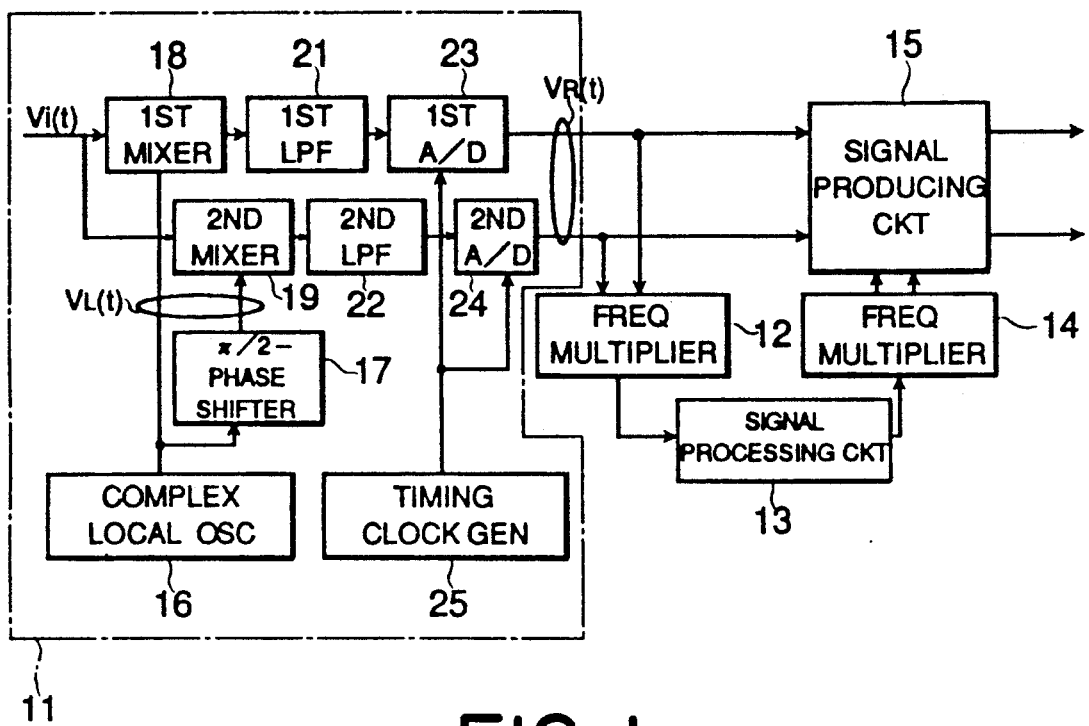
FIG. 1 is a block diagram of a conventional demodulator circuit.

Referring to FIG. 1, a conventional demodulator circuit will first described for a better understanding of the present invention. The conventional demodulator circuit is for demodulating a modulated signal into a demodulated signal. The modulated signal is derived by phase-modulating in m phases an original analog signal and having a particular frequency, where m represents a predetermined number. The demodulated signal is a reproduction of the analog signal.

The demodulator circuit comprises a signal converting circuit 11, a frequency multiplier 12, a signal processing circuit 13, a frequency demultiplier 14, and a signal producing circuit 15, each of which will be described in the following.

The signal converting circuit 11 is for converting the modulated signal into a digital signal and will later be described in detail. The frequency multiplier 12 is connected to the signal converting circuit 11 and is for multiplying the particular frequency by m to produce a frequency multiplied signal. The signal processing circuit 13 is connected to the frequency multiplier 12 and is for processing the multiplied signal into a modified signal of a multiplied frequency. The frequency demultiplier 14 is connected to the signal processing circuit 13 and is for demultiplying the multiplied frequency by m to produce a frequency demultiplied signal of the particular frequency. The signal producing circuit 15 is connected to the signal converting circuit 11 and the frequency demultiplier 14 and is for producing the demodulated signal in accordance with the digital and the demultiplied signals.

The signal converting circuit 11 comprises a complex local oscillator 16, a $\pi/2$-phase shifter 17, a first mixer 18, a second mixer 19, a first low-pass filter 21, a second low-pass filter 22, a first A/D converter 23, a second A/D converter 24, and a timing clock generator 25, each of which will be described in the following.

The complex local oscillator 16 is for generating a cosine-sine wave signal having a specific frequency substantially equal to the particular frequency of the modulated signal. The cosine-sine wave signal is supplied as a first wave signal to a first mixer 18 directly and as a second wave signal to the second mixer 19 through the $\pi/2$ phase shifter 17. A combination of the first and the second wave signals is labelled $V_L(t)$ and is represented as follows:

$$V_L(t) = \cos(\omega_L t + \theta_L) + j \cdot \sin(\omega_L t + \theta_L) \quad (1)$$
$$= e^{j(\omega_L t + \theta_L)},$$

where $\omega_L$ represents the specific frequency, $\theta_L$ representing a specific phase of the cosine-sine wave signal, j being an imaginary unit given by $j^2 = -1$.

Each of the first and the second mixers 18 and 19 is supplied with the modulated signal that is represented as follows:

$$V_f(t) = p(t) \cdot \cos(\omega_c t + \theta_c) - q(t) \cdot \sin(\omega_c t + \theta_c) \quad (2)$$
$$= \tfrac{1}{2} \cdot ((p(t) + jq(t)) \cdot e^{j(\omega_c t + \theta_c)} +$$
$$(p - jq)e^{-j(\omega_c t + \theta_c)}),$$

where $\omega_c$ represents the particular frequency, $\theta_c$ representing a particular phase of the modulated signal. It is to be noted that $\omega_L$ and $\omega_c$ are substantially equal to each other.

The first mixer 18 is for frequency-converting the modulated signal into a first baseband complex signal with reference to the first wave signal. The second mixer 19 is for frequency-converting the modulated signal into a second baseband complex signal with reference to the second wave signal. A combination of the first and the second baseband complex signals is calculated by multiplying the modulated signal $V_f(t)$ of Equation (2) and a complex conjugate $V_L^*$ of the combination $V_L$ of Equation (1) and is represented as follows:

$$V_f(t)V_L^*(t) = (p+jq)e^{j(\omega_R t+\theta_R)} + (p-jq)e^{j(\omega_L+\omega_c)t+(\theta_L+\theta_c)}, \quad (3)$$

where
$\omega_R = \omega_c - \omega_L$ and
$\theta_R = \theta_c - \theta_L$.

Responsive to the first and the second baseband complex signals, the first and the second low-pass filters 21 and 22 produce a first and a second filtered complex signal, respectively. In particular, the first and the second low-pass filters 21 and 22 delete the second term on the righthand side of Equation (3).

The first A/D converter 23 is for converting the first filtered complex signal into a first converted signal with reference to a sample timing clock signal which is supplied from the timing clock generator 25. The second A/D converter 24 is for converting the second filtered complex signal into a second converted signal with reference to the sample timing clock signal supplied from the timing clock generator 25. A combination of the first and the second converted signals is called the digital signal that is labelled $V_R(t)$ and is represented as follows:

$$V_R(t) = (p(t) + jq(t)) \cdot e^{j(\omega_R t + \theta_R)} \quad (4).$$

Figure 2:
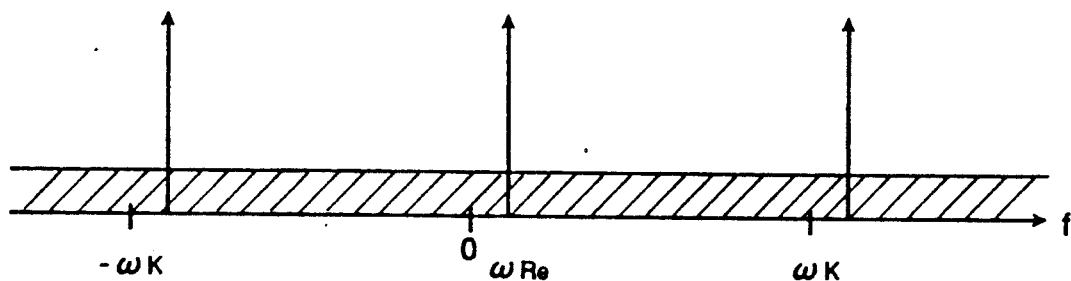
FIG. 2 shows a spectrum chart for use in describing operation of a multiplier circuit included in the demodulator circuit illustrated in FIG. 1.

The description will be directed to the frequency multiplier 12. The frequency multiplier 12 multiplies the digital signal $V_R(t)$ of Equation (4) by m to produce the multiplied signal. In the manner known in the art, the multiplied signal has a plurality of line spectrum components which is produced as exemplified in FIG. 2.

In the manner known in the art, the multiplied signal has a DC component and a clock component and is generally represented as follows:

$$V_R^m(t) = (a(t) + b(t)e^{j(\omega_k t + \theta_k)} + c(t)e^{-j(\omega_k t + \theta_k)}) \cdot e^{jm(\omega_R t + \theta_R)}, \quad (5)$$

where a(t) represents an amplitude of the DC component, a combination of b(t) and c(t) representing an amplitude of the clock component.

Figure 3:
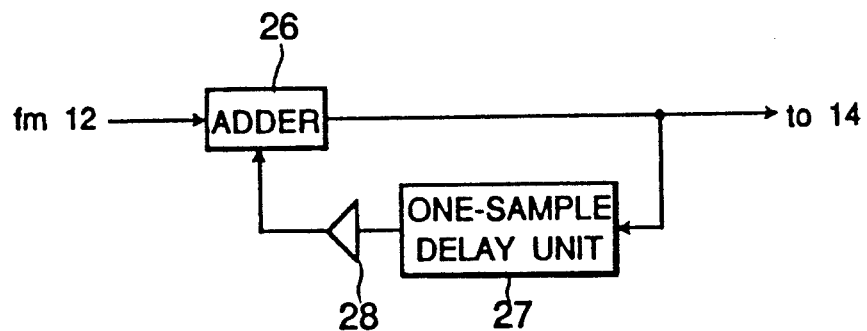
FIG. 3 is a block diagram of a signal processing circuit included in the demodulator circuit illustrated in FIG. 1.

Turning to FIG. 3, the description will proceed to the signal processing circuit 13. The signal processing circuit 13 comprises an adder 26, a one-sample delay unit 27, and an $\alpha$-multiplier 28 which are collectively operable as a low-pass filter in the manner known in the art.

The signal processing circuit 13 has a transmission function which is represented as follows:

$$T(Z) = \frac{1}{1 - \alpha Z^{-1}}, \quad (6)$$

where Z is calculated as follows:

$$Z = e^{ST}, \quad (7)$$

where, in turn, T and S are a sample period and a differential operator, respectively.

The signal processing circuit 13 carries out low-pass operation which is represented by the following Equation (9) except for coefficients.

$$T(S) = \frac{1}{1 + S\tau}, \quad (8)$$

where $\tau$ is calculated as follows:

$$T(S) = \frac{\alpha T}{1 - \alpha}. \quad (9)$$

Accordingly, the processing circuit 13 produces the modified signal that is given as follows:

$$V_T(t) = e^{j(m(\omega_R t + \theta_R) - \arctan m\omega_R \tau)} \quad (10).$$

Turning back to FIG. 1, the description will be directed to the frequency demultiplier 14. The frequency demultiplier 14 demultiplies the modified signal $V_T$ of Equation (11) by m to produce the demultiplied signal that is given as follows:

$$V_{RC}(t) = e^{j(\omega_R t + \theta_R - (1/m)\arctan m\omega_R \tau)} \quad (11).$$

The description will proceed to the signal producing circuit 15. In accordance with the digital and the demultiplied signals, the signal producing circuit 15 produces the demodulated signal that is given as follows:

$$V_O(t) = V_R(t) \cdot V_{RC}^*(t) \quad (12)$$
$$= (p + jq) \cdot e^{j(1/m)\arctan m\omega_R \tau}.$$

When $\omega_R \tau = 0$, the modulated signal is correctively demodulated.

Figure 4:
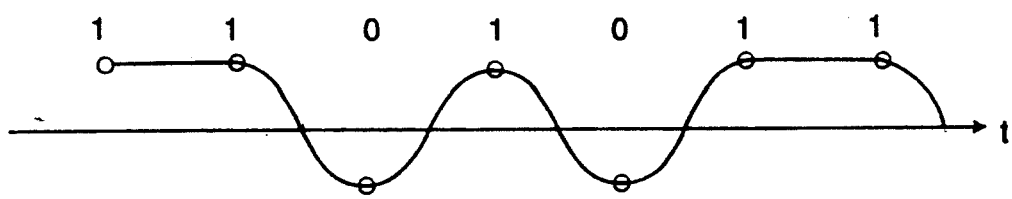
FIGS. 4 (A) through (D) show time charts for use in describing operation of the demodulator circuit illustrated in FIG. 1.
Figure 4:
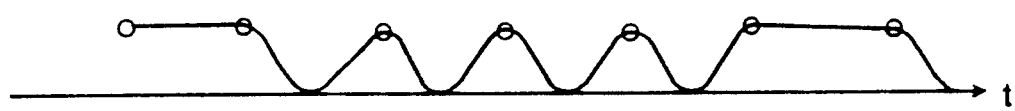
Figure 4:
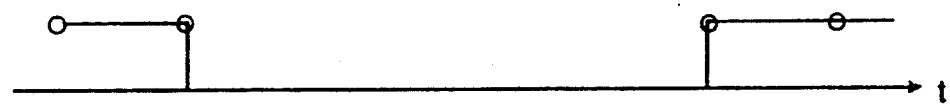
Figure 4:
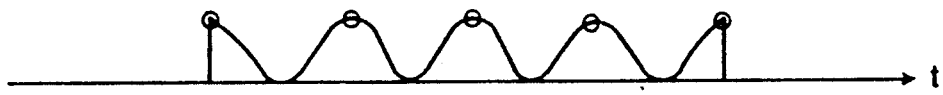

Referring to FIG. 4 together with FIG. 1, the description will be made as regards a case where m=2, namely, two-phase PSK is used and p=q. It will be assumed that the digital signal has a waveform illustrated along a first or top row labelled (A).

The frequency multiplier 12 multiplies the digital signal by m, namely, 2 to produce the multiplied signal illustrated along a second row labelled (B). The multiplied signal can be separated into the DC component and the clock component. The DC component is illustrated along a third row labelled (C). The clock component is illustrated along a fourth or bottom row labelled (D). It is to be noted that the multiplied signal appears in response to the DC component and that the DC component is not continuous in the third row (C). This means that the demodulated signal is interrupted when the clock component continuously appears during a long time.

In order to continuously produce the demodulated signal, it is necessary to make $\tau$ of Equation (9) be relatively great. However, the demodulated signal has a phase error when a great number is selected as $\tau$ of Equation (9). When the phase error is great, the demodulated signal has an error.

Figure 5:
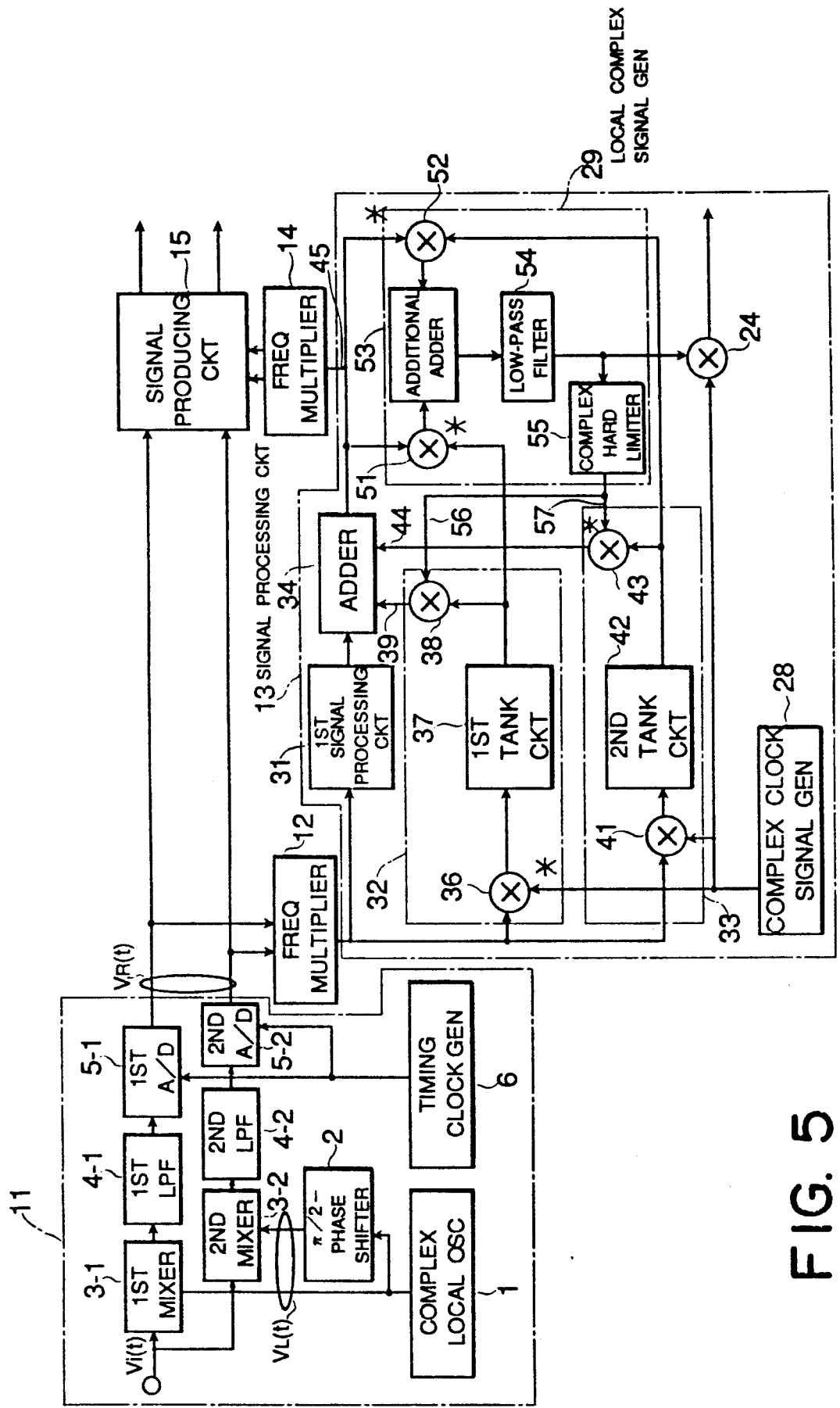
FIG. 5 is a block diagram of a demodulator circuit according to an embodiment of the instant invention.

Turning to FIG. 5, the description will be directed to a demodulator circuit according to a preferred embodiment of this invention. The demodulator circuit comprises similar parts designated by like reference numerals.

In FIG. 5, the signal processing circuit 13 comprises a complex clock signal generator 28 and a local complex signal producing circuit 29. The complex clock signal generator 28 is for generating a complex clock signal representing a first complex number and having a frequency which is substantially equal to the particular frequency. The complex clock signal is represented as follows:

$$V_{28}(t) = e^{j(\omega_{KL} t + \theta_{KL})} \quad (13).$$

In the manner which will later be described in detail, the local complex signal producing circuit 29 is for producing a complex local signal representing a second complex number. It is assumed that the complex local signal is represented as follows:

$$V_{29}(t) = e^{j\phi(t)} \quad (14).$$

The signal processing circuit 13 further comprises first, second, and third signal processing circuits 31, 32, and 33 and an adder 34 each of which will be described in the following.

The first signal processing circuit 31 is connected to the frequency multiplier 12 and is for processing the multiplied signal into a first processed signal represented as follows:

$$V_{31}(t) = a(t) e^{j(m\omega_R t + m\theta_R - \arctan m\omega_R \tau)} \quad (15).$$

The second signal processing circuit 32 is connected to the frequency multiplier 12, the complex clock signal generator 28, and the local complex signal producing circuit 29 and is for processing the multiplied signal into a second processed signal in accordance with the complex local signal and a conjugate complex clock signal which represents a complex conjugate of the first complex number. It is readily possible to make the complex clock signal generator 28 generate the complex clock signal as well as the conjugate complex clock signal. The second processed signal will become clear from the following description.

The second signal processing circuit 32 comprises a first multiplier 36, a first tank circuit 37, and a second multiplier 38. The first multiplier 36 is connected to the frequency multiplier 12 and the complex clock signal generator 28 and is for multiplying the multiplied signal by the conjugate complex clock signal to produce a first product signal which is represented as follows:

$$V_{36}(t) = V_R^m(t) \cdot V_{28}^*(t) \quad (16)$$
$$= (b(t)e^{j(\omega_{Ke}t + \theta_{Ke})} + a(t)e^{-j(\omega_{KL}t + \theta_{KL})} + c(t)e^{-j((\omega_K + \omega_{KL})t + \theta_K + \theta_L)})e^{jm(\omega_R t + \theta_R)},$$

where $$\omega_{Ke} = \omega_K - \omega_{KL} \text{ and}$$
$$\theta_{Ke} = \theta_K - \theta_{KL}.$$

The first tank circuit 37 is connected to the first multiplier 36 and is for processing the first product signal into a first filtered signal which is represented as follows:

$$V_{37}(t) = b(t)e^{j((m\omega_R + \omega_{Ke})t + m\theta_R + \theta_{Ke} - \arctan(m\omega_R + \omega_{Ke})\tau)} \quad (17).$$

The second multiplier 38 is connected to the local complex signal producing and the first tank circuits 29 and 37 and is for multiplying the complex local signal by the first filtered signal to produce a second product signal which is represented as follows:

$$V_{38}(t) = V_{37}(t) \cdot V_{29}^*(t) \quad (18)$$
$$= b(t)e^{j((m\omega_R + \omega_{Ke})t + m\theta_R + \theta_{Ke} - \arctan(m\omega_R + \omega_{Ke})\tau - \phi(t))}.$$

The second product signal is supplied as the second processed signal to the adder 34 through a line 39 which may be referred to as a first local supply arrangement.

The third signal processing circuit 33 is connected to the frequency multiplier 12, the complex clock signal generator 28, and the local complex signal producing circuit 29 and is for processing the multiplied signal into a third processed signal in accordance with the complex clock signal and a conjugate complex local signal which represents a complex conjugate of the second complex number. The third processed signal will be clear from the following description.

The third signal processing circuit 33 comprises a third multiplier 41, a second tank circuit 42, and a fourth multiplier 43. The third multiplier 41 is connected to the frequency multiplier 12 and the complex clock signal generator 28 and is for multiplying the multiplied signal by the complex clock signal to produce a third product signal which is represented as follows:

$$V_{41}(t) = V_R{}^m(t) \cdot V_{KL}(t) \qquad (19)$$
$$= (c(t)e^{-j(\omega Ke t + \theta Ke)} + a(t)e^{j(\omega LK t + \theta KL)} +$$
$$b(t)e^{j((\omega K + \omega KL)t + \theta K + \theta KL)})e^{jm(\omega Rt + \theta R)}.$$

The second tank circuit 42 is connected to the third multiplier 41 and is for processing the third product signal into a second filtered signal which is represented as follows:

$$V_{42}(t) = c(t)e^{j((m\omega R - \omega Ke)t + m\theta R - \theta Ke - \arctan(m\omega R - \omega Ke)\tau)} \qquad (20).$$

The fourth multiplier 43 is connected to the local complex signal producing and the fourth tank circuits 29 and 42 and is for multiplying the conjugate complex local signal by the second filtered signal to produce a fourth product signal which is represented as follows:

$$V_{43}(t) = V_{42}(t) \cdot V_{29}(t) \qquad (21)$$
$$= c(t)e^{j((m\omega R - \omega Ke)t + m\theta R - \theta Ke - \arctan(m\omega R - \omega Ke)\tau + \phi(t))}.$$

The fourth product signal is supplied as the third processed signal to the adder 34 through a line 44 which may be referred to as a second local supply arrangement.

The adder 34 is for summing up the first, the second, and the third processed signals into a sum signal which is represented as follows:

$$V_{34}(t) = e^{j(m\omega Rt + m\theta R)} \times (a(t)e^{-j\arctan m\omega R\tau} + \qquad (22)$$
$$b(t)e^{j(\omega Ke t + \theta Ke - \arctan(m\omega R + \omega Ke)\tau - \phi(t))} +$$
$$c(t)e^{j(-\omega Ke t - \theta Ke - \arctan(m\omega R - \omega Ke)\tau + \phi(t))}).$$

The sum signal is supplied as the modified signal to the demultiplier 14 through a line 45 which may be referred to as a supply arrangement.

The description will be directed to the local complex signal producing circuit 29. The local complex signal producing circuit 29 comprises a first correlation detector 51, a second correlation detector 52, an additional adder 53, a low-pass filter 54, and a complex hard limiter 55, each of which will be described in the following. It is to be noted herein that the sum signal represents a particular complex number, the first processed local signal representing a first specific complex number, the first filtered signal representing a second specific complex number.

The first correlation detector 51 is connected to the afore-mentioned adder 34 and the first tank circuit 37 and is for multiplying the sum signal supplied from the adder 34 by a conjugate first filtered signal supplied from the first tank circuit to produce a first correlation signal. The conjugate first filtered signal represents a complex conjugate of the first filtered signal. The first correlation signal is represented as follows:

$$V_{51}(t) = V_{37}(t) \cdot V_{34}{}^*(t) \qquad (23)$$
$$= b(t)(a(t)e^{j(\omega Ke t + \theta Ke - \arctan(m\omega R + \omega Ke)\tau + \arctan m\omega R\tau)}$$
$$+ b(t)e^{j\phi(t)} +$$
$$c(t)e^{j(2\omega Ke t + 2\theta Ke + \arctan(m\omega R - \omega Ke)\tau - \arctan(m\omega R + \omega Ke)\tau - \phi(t))}).$$

The second correlation detector 52 is connected to the adder 34 and the second tank circuit 42 and is for multiplying a conjugate sum signal supplied from the adder 34 by the second filtered signal supplied from the second tank circuit 42 to produce a second correlation signal. The conjugate sum signal represents a complex conjugate of the sum signal. The second correlation signal is represented as follows:

$$V_{52}(t) = V_{42}(t) \cdot V_{34}(t) \qquad (24)$$
$$= c(t)(a(t)e^{j(\omega Ke t + \theta Ke + \arctan(m\omega R - \omega Ke)\tau - \arctan m\omega R\tau)}$$
$$+ b(t)e^{j(2\omega Ke t + 2\theta Ke + \arctan(m\omega R - \omega Ke)\tau - \arctan(m\omega R + \omega Ke)\tau - \phi)} +$$
$$c(t)e^{j\phi(t)}).$$

The additional adder 53 is connected to the first and the second correlation detectors 51 and 52 and is for summing up the first and the second correlation signals into an additional sum signal which is represented as follows:

$$V_{53}(t) = (b^2 + c^2)e^{j\phi(t)} + \qquad (25)$$
$$ae^{j(\omega Ke + \theta Ke)}(be^{j(\arctan(m\omega R + \omega Ke)\tau - \arctan m\omega R\tau)} +$$
$$ce^{j(\arctan(m\omega R - \omega Ke)\tau - \arctan m\omega R\tau)}) +$$
$$2bce^{j(2\omega Ke t + 2\theta Ke)} \cdot e^{j(\arctan(m\omega R - \omega Ke)\tau - \arctan(m\omega R + \omega Ke)\tau - \phi)}.$$

In order to maintain a normal condition of the additional adder 53, it is necessary that $\phi(t)$ has a frequency equal to $\omega_{Ke}$.

Herein, it will be assumed that:

$$e^{j\phi(t)} = e^{j(\omega Ke t + \theta Ke + \phi)}, \qquad (26)$$

where $\phi$ represents the phase error. In this event, the additional sum signal is represented as follows:

$$V_{53}'(t) = e^{j(\omega Ke t + \theta Ke + \phi_m(t))}, \qquad (27)$$

where:

$$e^{j\phi_m(t)} = (b^2 + c^2)e^{j\phi} + \qquad (28)$$
$$abe^{-j(\arctan(m\omega R + \omega Ke)\tau - \arctan m\omega R\tau)} +$$
$$ace^{j(\arctan(m\omega R - \omega Ke)\tau - \arctan m\omega R\tau)} +$$
$$2bce^{-j\phi} \cdot e^{j(\arctan(m\omega R - \omega Ke)\tau - \arctan(m\omega R + \omega Ke)\tau)}.$$

The low-pass filter 54 is connected to the additional adder 53 and is for carrying out an averaging operation of the additional sum signal to produce an averaged signal having an amplitude representative of a result of the averaging operation. The averaged signal is represented as follows:

$$V_{54}(t) = e^{j(\omega Ke^t + \theta Ke + \phi m(t) - arctan \omega Ke D)}, \quad (29)$$

where D represents a time constant, D >> 7.

In Equation (29), $\omega_{Ke}$ is very small. Accordingly, Equation (28) is rewritten into:

$$e^{j\phi m(t)} \approx (b^2 + c^2)e^{j\phi} + a(b+c) + 2bce^{-j\phi} \quad (30).$$

In this event, the averaged signal is represented as follows:

$$\overline{e^{j\phi}m} = (\overline{b^2 + c^2})e^{j\phi} + \overline{a(b+c)} + \overline{2bc}e^{-j\phi}, \quad (31)$$

where each of a, b, and c represents the amplitude of the averaged signal and is represented by an integer. Furthermore, $e^{ja\phi}$ represents a phase component of the averaged signal, where $\alpha < 1$.

The complex hard limiter 55 is connected to the low-pass filter 54 and is for limiting the amplitude of the averaged signal to produce a limited signal. Since the limited signal represents the phase component of the averaged signal, the following equation is introduced.

$$\alpha\phi - \arctan \omega_{Ke}D = \phi \quad (32).$$

Therefore:

$$\phi = -\arctan \omega_{Ke}D/(1-\alpha) \quad (33).$$

Thus, the phase error $\phi$ is maintained in a predetermined range. Generally, the phase error $\phi$ becomes as follows:

$$\phi \approx 0 \quad (34).$$

More particularly, the limited signal represents a second complex number and may therefore be called herein the complex local signal. In addition, the complex hard limiter 55 carries out a predetermined calculation in accordance with the complex local signal to produce the conjugate complex local signal as a result of the predetermined calculation in the manner known in the art.

The complex local signal is supplied to the second multiplier 38 through a line 56 which will be referred to as a first additional supply arrangement. The conjugate complex local signal is supplied to the fourth multiplier 43 through a line 57 which will be referred to as a second additional supply arrangement.

The signal processing circuit 13 further comprises an additional multiplier 58 connected to the complex clock signal generator 28 and the low-pass filter 54. The additional multiplier 58 is for multiplying the complex clock signal by the averaged signal to produce a particular clock signal which represents the above-mentioned clock component.

The description will be turned back to the adder 34. Equation (22) is rewritten into:

$$V_{34'}(t) = e^{j(m\omega Rt + m\theta R)} \times (ae^{-j \arctan m\omega R\tau} +$$
$$be^{-j(\arctan(m\omega R + \omega Ke) + \phi)} + ce^{j(\phi - \arctan(m\omega R - \omega Ke))}). \quad (35)$$

When $\omega_{Ke}$ is sufficiently small, Equation (35) is rewritten into:

$$V_{16}(t) \approx (a+b+c)e^{j(m\omega Rt + m\theta R - \arctan (m\omega R\tau))} \quad (36).$$

When the above-mentioned m is constant, a represents nonzero. The m is increased, b represents nonzero. The m is decreased, c represents nonzero. Accordingly, (a+b+c) is not equal to zero. As a result, the DC component is obtained regardless of the value of m.

As is clear from Equation (31), the clock component is present in a stable form in a case where both of b and c are not zero, namely, where the modulated signal has a change point therein. Accordingly, the DC component is produced by using the stable form of the clock component even when the clock component is present.

While the present invention has thus far been described in connection with only a single embodiment thereof, it will readily be possible for those skilled in the art to put this invention into practice in various other manners. For example, each of the first signal processing, the first tank, and the second tank circuits 31, 37, and 42 may be a low-pass filter in the manner known in the art.

What is claimed is:

1. A demodulator circuit for demodulating a modulated signal into a demodulated signal, said modulated signal being derived by phase-modulating in m phases an original analog signal and having a particular frequency, said demodulated signal being a reproduction of said analog signal, said demodulator circuit comprising a signal converting circuit for converting said modulated signal into a digital signal, a frequency multiplier for multiplying said particular frequency by m to produce a multiplied signal, a signal processing circuit for processing said multiplied signal into a modified signal of a multiplied frequency, a frequency demultiplier for demultiplying said multiplied frequency by m to produce a demultiplied signal of said particular frequency, and a signal producing circuit for producing said demodulated signal in accordance with said digital and said demultiplied signals, wherein said signal processing circuit comprises:

a complex clock signal generator for generating a complex clock signal representing a first complex number and having a frequency which is substantially equal to said particular frequency;

a local complex signal producing circuit for producing a complex local signal representing a second complex number;

a first signal processing circuit connected to said frequency multiplier into a first processed signal;

a second signal processing circuit connected to said frequency multiplier for processing said multiplied signal into a second processed signal in accordance with a conjugate complex clock signal supplied from said complex clock signal generator and with the complex local signal supplied from said local complex signal producing circuit;

a third signal processing circuit connected to said frequency multiplier for processing said multiplied signal into a third processed signal in accordance with a complex clock signal supplied from said complex clock signal generator and with a conjugate complex local signal supplied from said local complex signal producing circuit;

an adder connected to said first, said second, and said third signal processing circuits for summing up said first, said second, and said third processed signals into a sum signal; and supply means connected to said frequency demultiplier and said adder for supplying said sum signal as said modified signal to said frequency demultiplier.

2. A demodulator circuit as claimed in claim 1, wherein said second signal processing circuit comprises:

- a first multiplier connected to said frequency multiplier for multiplying said multiplied signal by said conjugate complex clock signal to produce a first product signal;
- a first tank circuit connected to said first multiplier for processing said first product signal into a first filtered signal;
- a second multiplier connected to said first tank circuit for multiplying said complex local signal by said first filtered signal to produce a second product signal; and
- first local supply means connected to said adder and said second multiplier for supplying said second product signal as said second processed signal to said adder, said third processing circuit comprising:
- a third multiplier connected to said frequency multiplier for multiplying said multiplied signal by said complex clock signal to produce a third product signal;
- a second tank circuit connected to said third multiplier for processing said third product signal into a second filtered signal;
- a fourth multiplier connected to said second tank circuit for multiplying said conjugate complex local signal by said second filtered signal to produce a fourth product signal; and
- second local supply means connected to said adder circuit and said fourth multiplier for supplying said fourth product signal as said third processed signal to said adder circuit.

3. A demodulator circuit as claimed in claim 2, said sum signal representing a particular complex number, said first processed local signal representing a first specific complex number, said first filtered signal representing a second specific complex number, wherein said local complex signal producing circuit comprises:

- a first correlation detector connected to said adder and said first tank circuit for multiplying the sum signal supplied from said adder by a conjugate first filtered signal supplied from said first tank circuit to produce a first correlation signal;
- a second correlation detector connected to said adder and said second tank circuit for multiplying a conjugate sum signal supplied from said adder by the second filtered signal supplied from said second tank circuit to produce a second correlation signal;
- an additional adder connected to said first and said second correlation detectors for summing up said first and said second correlation signals into an additional sum signal;
- a low-pass filter connected to said additional adder for carrying out an averaging operation of said additional sum signal to produce an averaged signal having an amplitude representative of a result of said averaging operation;
- a complex hard limiter connected to said low-pass filter for limiting the amplitude of said averaged signal to produce a limited signal;
- first additional supply means connected to said second multiplier and said complex hard limiter for supplying said limited signal as said complex local signal to said second multiplier; and
- second additional supply means connected to said fourth multiplier and said complex hard limiter for supplying said limited signal as said conjugate complex local signal to said fourth multiplier.

* * * * *